United States Patent

[11] 3,591,157

[72] Inventors John E. Culp, Jr.
 Allentown;
 Howard E. Schwartz, Emmaus, both of, Pa.
[21] Appl. No 796,844
[22] Filed Feb. 5, 1969
[45] Patented July 6, 1971
[73] Assignee Air Products and Chemicals, Inc.
 Allentown, Pa.

[54] SHAPE CUTTING MACHINE
 10 Claims, 3 Drawing Figs.
[52] U.S. Cl.................................................. 266/23 R,
 266/23 K
[51] Int. Cl..................................................... B23k 7/02
[50] Field of Search.......................................... 266/23 A,
 23 I, 23 K, 23 M; 90/13.99

[56] References Cited
 UNITED STATES PATENTS
3,328,555  6/1967  Dirter............................ 266/23

3,390,315  6/1968  McConough et al. ........  90/13
3,443,804  5/1969  Roder............................ 266/23
 OTHER REFERENCES
 Publication: THE IRON AGE; May 1, 1958; pages 90—91 copy in class 266, subclass 23

Primary Examiner—Gerald A. Dost
Attorneys—Ronald B. Sherer and B. Max Klevit

ABSTRACT: A multiple torch-shape cutting machine adapted to be responsive to a tape program control for automatically setting the centerline distance between the torches on the machine. Means are provided for positioning the torches relative to one another by engaging or disengaging the individual torch support with a moveable arm adapted to be moved by the program control.

INVENTORS
JOHN E. CULP, Jr. &
HOWARD E. SCHWARTZ
BY
Ronald B. Sherr
ATTORNEY

SHAPE CUTTING MACHINE

BACKGROUND OF THE INVENTION

The invention pertains particularly to the field of multiple torch-shape cutting machines of the type in which a programmed input control automatically controls the movement of a plurality of torches to cut a desired shape.

The shape cutting machines of the prior art generally involve a carriage which runs on rails and carries mechanism supporting the torches and mounted for movement transversely of the carriage movement. The carriage and torch supporting mechanism transmit motion to the torches under the control of a programmed tape control or a tracing head which is also mounted on the carriage above a tracing table.

One form of shape cutting machine illustrative of the prior art devices is shown in U.S. Pat. No. 3,172,938.

In the prior art machines, it has been necessary to manually position the torches relative to one another for each pattern to be cut. Such torch positioning is necessary in order to provide the best torch arrangement to obtain the most efficient layout of the various parts to be cut from a given plate. Thus it is desirable to be able to change the position of the torches after each cutting of a row of parts so that the torches will be spaced the proper distance for cutting the next row of parts which may be of a different size or number than the previous row. With the prior art devices it was necessary to manually change the position of the torches each time. Thus, because of the required manual operation, the prior art multiple torch shape cutting machines have not been fully automated.

SUMMARY OF THE INVENTION

In accordance with the invention, means are provided for use with a multiple torch-shape cutting machine or the like for automatically positioning the torches as desired in response to a control input. Briefly stated, this positioning means comprises mechanism for engaging or disengaging a torch support with a transversely moveable arm adapted to be moved in response to a suitable control.

By this arrangement, it is possible to fully automate a multiple torch-shape cutting machine by connecting the torch positioning means to be responsive to a tape control program or the like. Moreover, by means of the invention it is possible to adapt the present day tape or numerical-controlled machines to be fully automatic without the addition of separate drive motors, feedback devices and additional axes of numerical control.

Furthermore, the torch positioning mechanism provided in accordance with the invention involves a very simple construction wherefore the advantageous function of the torch positioning can be achieved at a minimum of cost.

DESCRIPTION OF THE PREFERRED EMBODIMENT

Figure 1:
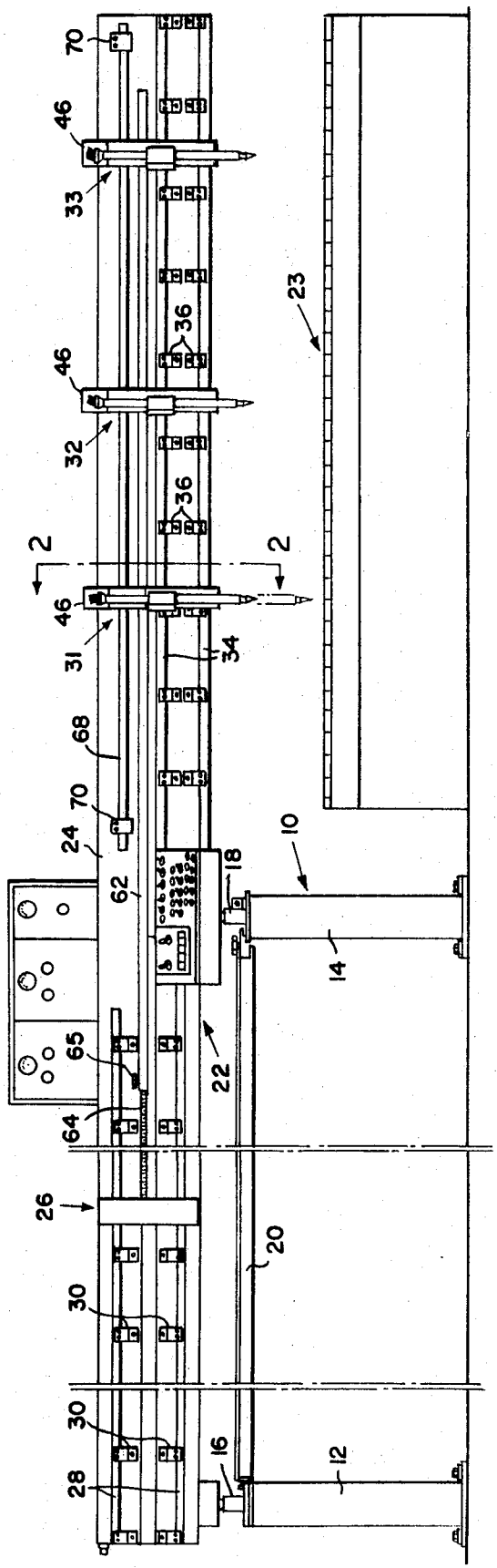
FIG. 1 is an elevation of a multiple torch-shape cutting machine in accordance with the invention.

The machine in accordance with the invention comprises a main frame 10 including upright pedestal members 12 and 14 supporting a pair of horizontally extending guide rails 16 and 18. A templet or pattern supporting table 20 is shown in FIG. 1 and is employed in conventional machines although it may be omitted in the machine in accordance with the present invention.

There is provided a main carriage 22, including an elongated frame member 24, and supported by rollers for movement along the rails 16 and 18, the carriage movement being provided by conventional mechanism, such as a drive chain (not shown).

A transverse carriage member 26 is mounted on a pair of horizontally extending, vertically spaced rails 28 mounted on the frame member 24 by means of brackets 30. The rails 28 extend along the frame member 24 transversely of the rails 16 and 18 and serve to guide the carriage member 26 for movement therealong on an axis extending transversely of the rails 16 and 18. The carriage member 26 may be constructed like the supporting structure for a tracer unit in the event that it is desired to make the machine readily convertible to control by a tracer unit which follows a pattern drawn on a templet which is positioned on the table 20. However, in accordance with the preferred embodiment of the invention, the machine is completely tape controlled.

A suitable programmer in the form of a programmed tape control is provided for causing longitudinal movement of main carriage 22 along rails 16 and 18 and for concurrently causing transverse movement of carriage member 26 along rails 28 so as to cause carriage member 26 to follow a desired contour or shape in accordance with the program.

Figure 3:
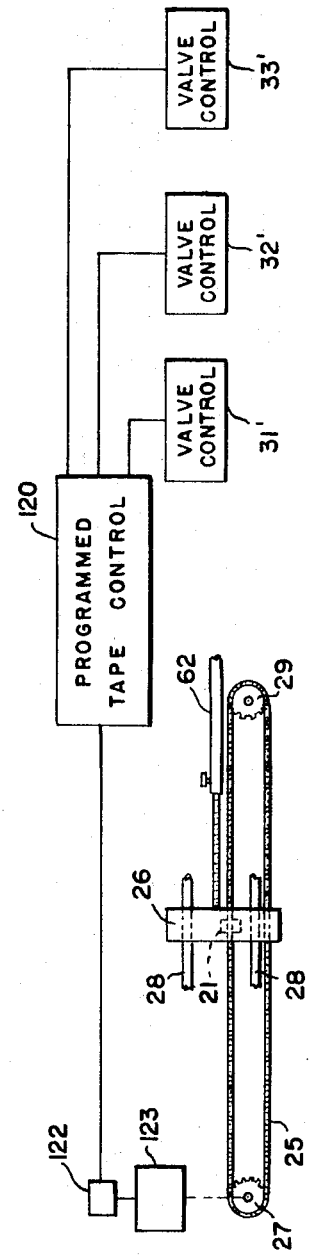
FIG. 3 is a block diagram of one form of control for the machine in accordance with the invention.

The drive for the carriage 22 is entirely conventional and may take any suitable form known in the art, such as a motor driven sprocket engaging a drive chain extending longitudinally along rail 18. The drive for the carriage member 26 is also essentially conventional and comprises, as is shown in FIG. 3, an endless chain 25 moveable around a pair of spaced sprockets 27 and 29, sprocket 27 being motor driven under the control of the programmer 120 as will be described more fully hereafter. In other words, the longitudinal movement of carriage member 26 is provided by the movement of the main carriage 22 which supports the same and the transverse movement of the carriage member 26 is provided by the transverse drive mechanism described above, both drive means being controlled by the programmer.

The carriage frame member 24 has a portion extending to the right from the frame 10 and over a cutting table 23 which supports the work to be cut at a location spaced from the pedestal member 14 as is shown in FIG. 1. Means are provided for supporting a plurality of cutting torches 31, 32 and 33 on the extending portion of the frame member 24 for transverse movement with the carriage member 26 and for longitudinal movement with the main carriage 22 and frame member 24 so that the torch movement is made to conform exactly to the movement of the carriage member 26 and the programmed shape to be cut. To this end, there is provided a pair of horizontally extending, vertically spaced guide rails 34 mounted on the frame member 24 by means of plurality of brackets 36 secured to frame member 24 and spaced longitudinally there along as viewed in FIG. 1. The rails 34 are secured to brackets 36 by means of mounting bolts 38 as is best shown in FIG. 2.

Each of the torches 31, 32 and 33 is of the plasma type, although it will be apparent that various types of cutting torches may be employed.

Figure 2:
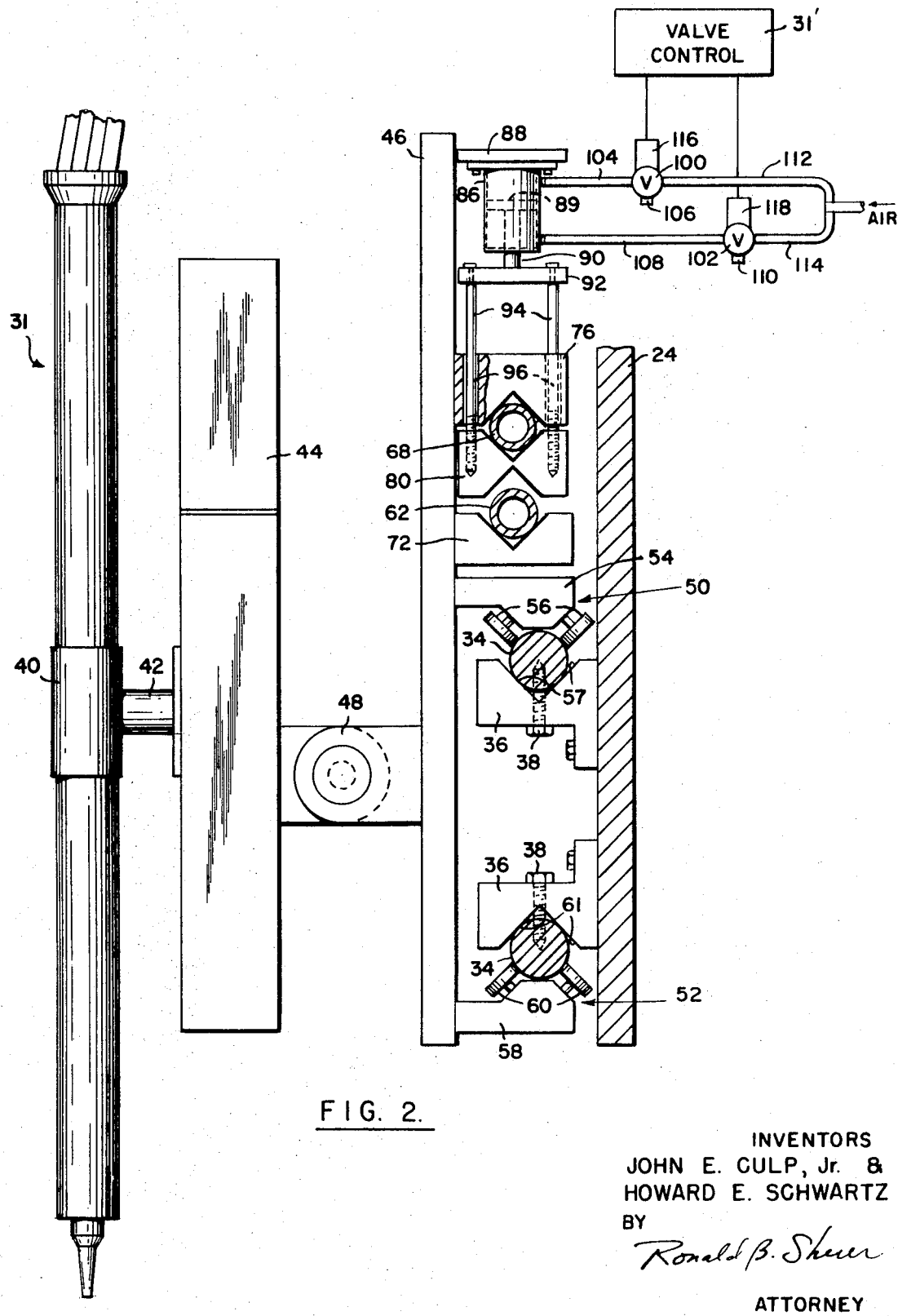
FIG. 2 is an enlarged fragmentary sectional view taken on line 2-2 of FIG. 1 and including a schematic illustration of the control mechanism for one torch.

Each of the torches 31, 32 and 33 is mounted for movement along the rails in identical fashion in the manner shown in FIG. 2 wherein the mounting for the torch 31 is shown. Accordingly only the mounting for torch 31 will be described in detail. The torch 31 has a clamp means 40 grippingly secured to its body, the clamp means 40 being carried by the positioning arm 42 of a conventional torch lifter 44. The torch lifter 44 serves to position the torch 31 at a desired height for cutting, the positioning of torch 31 being illustrated in FIG. 1. The torch lifter 44 is secured to a torch support by means of a conventional pivotal support 48.

The torch support 46 is mounted on the upper and lower rails 34 for movement therealong by means of upper and lower guide roller means 50 and 52, respectively. The upper guide roller means 50 comprises a bracket 54 secured to the rear wall of torch support 46 and carrying a pair of guide rollers 56 being angularly mounted for rolling contact with the upper rail 34 at angularly spaced locations on its upper portion. The rollers 56 contact the upper portion of upper rail 34 at locations in opposed relation to the contacting location of the upper rail-supporting brackets 36, each of which has a troughlike rail contacting portion 57. The lower guide roller means 52 comprises a bracket 58 secured to the rear wall of torch support 46 and carrying a pair of guide rollers 60 which are angularly mounted for rolling contact with the lower rail 34 at angularly spaced locations on the lower portion of this rail. The rollers 60 contact the lower rails 34 at locations opposed to the lines of contact of the lower brackets 36, each of which has a troughlike rail contacting portion 61.

It will be apparent that by this mounting arrangement the torch support 46 is supported on the frame member 24 by means of the rails 34 and is moveable horizontally along these rails. Also, the rails 34 and the support member 46 are interconnected together for pure horizontal movement with no vertical variations by reason of the arrangement whereby the rollers 56 and the rollers 60 cooperate with the angularly spaced upper and lower portions of the upper and lower rails 34.

It will be noted that the mounting for the transverse carriage member 26 on the rails 28 is similar to the mounting arrangement for the torch support 46.

In accordance with the invention, means are provided for positioning each of the torches in any desired location along the frame member 24 in response to a control input. The means for each of the torches is identical wherefore only the specific means for the torch 31 will be described in detail, such means being shown in detail in FIG. 2. To this end, there is provided a usual moveable torch drive bar made up of a pair of bars 62 and 64. The bar 64 telescopes within one end of the bar 62 which is tubular, as is best shown in FIG. 1, and is provided with a graduated scale for use in the actual calibrated setting of the length of the drive bar, a setscrew member 65 being used to secure bars 62 and 64 together. The bar 64 is secured for movement with the transverse carriage member 26 while the bar 62 extends along the extended portion of the frame member 24 in the region of the torches 31, 32 and 33.

A stationary locking bar 68 is mounted to extend horizontally along the extended portion of the frame member 24 and is spaced vertically above the bar 62 in parallel relation thereto. The locking bar 68 is fixedly secured on the frame member 24 by a pair of brackets 70.

In accordance with the invention, means are provided for automatically engaging the torch support 46 with either the bar 62 of the moveable drive bar or with the stationary locking bar 68. Such means comprises a first clamp member 72 fixedly secured on the rear side of the torch support 46. This clamp member 72 is provided with a friction liner facing the lower side of bar 62. A second clamp member 76 is fixedly secured to the rear side of the torch support 46 and is provided with a friction liner facing the upper portion of the stationary locking bar 68. Positioned between the bars 62 and 68 and the stationary clamp members 72 and 76 is a moveably mounted clamping member 80. The clamping member 80 is provided with a friction liner facing downwardly towards the upper portion of the bar 62 and a friction liner 84 facing upwardly towards the lower portion of the bar 68.

There are provided means for moveably supporting the clamping member 80 and for actuating the same between an upper position in which the stationary locking bar 68 is clamped tightly between clamp member 76 and clamping member 80 and a lower position in which the bar 62 of the moveable drive bar is clamped tightly between clamp member 72 and clamping member 80. Such means includes an actuator means comprising an air cylinder 86 mounted on a bracket 88 secured to the torch support 46. The actuator rod 90 of the air cylinder actuating means is secured to a crosshead 92 which is connected to the upper end of a pair of rods 94. The rods 94 extend downwardly from the crosshead 92 freely through openings 96 in the upper clamp member 76 into threaded engagement with the moveable clamping member 80. By this arrangement, the movement of the actuator rod 90 in response to the application of air pressure to the cylinder 86 is used to position the clamping member 80 in the upper position in engagement with the bar 68 as well as in the lower position in engagement with the bar 62.

It will be apparent that in the upper position of the clamping member 80, the torch support 46 will be engaged with the stationary locking bar 68 whereby the torch 31 will be held in a fixed transverse position. It will also be noted that in this position of the parts, the bar 62 of the drive bar may be moved axially relative to the torch support 46. On the other hand, in the lower position of the clamping member 80, the torch support 46 will be engaged with the bar 62 of the drive bar and will be moveable along with this bar transversely along guide rails 34 in accordance with the movement of the drive bar.

Control means are provided for controlling the application of air to the cylinder 86 to set the position of the clamping member 80 and hence determine whether the torch support 46 is in engagement with the bar 68 or with the bar 62. Such means comprises a pair of solenoid operated, two-way valves 100 and 102. One outlet of the valve 100 is connected through a line 104 to the cylinder 86 at a location on the upper side of a piston 89 connected to the actuator rod 90 within the cylinder 86. Another outlet of the valve 100 is connected to a discharge fitting 106 connected to atmosphere.

One outlet of the valve 102 is connected through a line 108 to the cylinder 86 at a location beneath the piston 89. Another outlet of the valve 102 is connected to a discharge fitting 110 connected to atmosphere. The inlets of the valves 100 and 102 are supplied with air under pressure from a suitable air supply by way of lines 112 and 114, respectively.

The valves 100 and 102 are actuated between two control positions by solenoids 116 and 118, respectively.

In one flow control position, valve 100 provides communication between line 112 and line 104, and in the other control position valve 100 provides flow communication between line 104 and discharge fitting 106. In one flow control position valve 102 provides communication between line 114 and line 108 and in its other control position valve 102 provides communication between line 108 and discharge fitting 110 whereby the piston 89 will be actuated to its lower position, and, alternately, the valve control is such that when the valve 100 is positioned to provide communication between line 104 and discharge fitting 106, valve 102 is positioned to provide communication between lines 114 and 108 whereby air is supplied to the lower side of piston 89 to actuate the same to its upper position. In this manner, the control means is operable to actuate the clamping member 80 to either the upper or lower positions discussed above.

As shown in FIG. 3, there is provided an individual valve control for each of the torches, the valve control for the torch 31 being indicated at 31′, the valve control for torch 32 being indicated at 32′, and the valve control for torch 33 being indicated at 33′. Each of the valve controls 31′, 32′ and 33′ is controlled by a master control indicated at 120 which may take the form of a programmed tape control as is well known in the art. Suitable control means are provided for signalling the individual controls 31′, 32′ and 33′ to actuate the solenoids of the associated control valves thereof to either of the two flow-controlling positions so as to place the associated moveable clamping member 80 in contact with either of the bars 62 or 68 and thereby provide for engagement of the tool support 46 with either of these bars 62 or 68.

As shown in FIG. 3, the master control 120 is also arranged to control a control means 122 for a reversible drive motor 123 for the sprocket 27 which drives the transverse carriage member drive chain 25 to position the carriage member 26 and the drive bar carried thereby in the desired transverse position. The control devices to achieve this function are, of course, well-known.

In describing the operation of the machine in accordance with the invention, let it be assumed that a contouring program for a particular part has been completed and it is desirable to rearrange the torches along the axis of the frame member 24 so as to change the spacing between the torch cutting stations. This fact has been programmed into the tape control for the machine and the program control 120 issues appropriate signals to the torch valve controls 31', 32' and 33' and the drive bar drive control 122 to effect the programmed change in the spacing between the torches. It will be apparent that when a signal is sent to the individual torch valve control to engage the associated torch support 46 with the stationary locking bar 68, the bar 62 may move through the clamping mechanism without the torch support moving therewith. On the other hand, when the program control issues a signal to the valve control to actuate the associated clamping mechanism into engagement with the bar 62 of the moveable drive bar, the torch support 46 will be moved along with this moveable bar 62. It will be apparent that by this arrangement the torches 31, 32 and 33 may be easily positioned at various positions on the moveable bar 62.

For example, in order to place the torch 31 on the bar 62 at a location to the right of that shown in FIG. 1, the programmed control 120 would issue a signal to the torch control 31' to actuate the associated clamping member 80 to the upper position to clamp the tool support with the stationary locking bar 68. The control means 122 for motor 123 would then receive a signal from the programmed control 120 to cause rotation of sprocket 27 in a counterclockwise direction so that the chain 25 causes movement of the carriage 26 and the bar 62 to the left a desired amount. The programmed tape control would then issue a signal to the torch valve control 31' to actuate the clamping member 80 to the lower position in engagement with the moveable bar 62 at the desired location to the right of that shown in FIG. 1.

In this manner, all of the torches 31, 32 and 33 may be positioned at the desired location pursuant to the control directions of the programmed tape control 120. The machine is now prepared for a subsequent contour cutting operation. This will be achieved by the programmer which causes the carriage member 26 to follow a pattern programmed into the tape control, and as the carriage member 26 moves longitudinally or transversely in either direction, this movement is followed by the bars 64 and 62 of the drive bar and, of course, by the torches 31, 32 and 33 which are secured to the bar 62 at the programmed location.

It will be noted that by the construction in accordance with the invention, a multiple torch shape cutting machine may be designed to be fully automated with all phases of the operation being controlled by a suitable tape program. This tape program may be utilized to control all phases of the operation of the machine including the centerline distance changes between the torches on the machine for various patterns. Furthermore, it will be apparent that this advantageous function of torch positioning is achieved by a simple mechanism involving a minimum of cost.

It is to be understood that the above description is illustrative and it will be apparent that various changes may be made in the construction and arrangement of parts without departing from the scope of the invention. For example, the invention may be employed in various multiple-shape reproducing machines used in welding and allied processes, such as shape cutting, welding, metal spraying or the like. This would be accomplished by simply replacing the illustrated cutting torches with welding torches, spray guns or the like. Moreover, the automatic tool-positioning means in accordance with the invention may be incorporated in tracer unit-controlled machines, if desired, by providing for switching between tape control and tracer control. Accordingly, it is not desired to be limited except as required by the following claims.

We claim:

1. In a multiple-shape reproducing machine for use in welding and allied processes, such as shape cutting, welding, metal spraying or the like, having a main carriage mounted for movement on a first axis, a transverse carriage mounted on said main carriage for movement transversely of the main carriage movement, a plurality of tools mounted on said main carriage for movement with said transverse carriage, and a master control means for automatically controlling operation of the shape reproducing machine, the combination comprising means for individually supporting each of said tools at spaced locations along said transverse axis, and tool-positioning means responsive to control signals from said master control means for automatically fixing the spacing between said tools along said transverse axis during the operating cycle.

2. The combination according to claim 1 wherein said tool-positioning means comprises a stationary bar extending along said transverse axis, a movably mounted bar extending along said transverse axis, means for moving said movable bar, means for engaging each of said individual tool supporting means with either said stationary bar or said movable bar, and individual control means for each of said tools responsive to said master control for actuating said engaging means to either of its engaging positions.

3. The combination according to claim 2 wherein said tool support engaging means comprises a first clamp member secured to said tool support and positioned adjacent said stationary bar, a second clamp member secured to said tool support and positioned adjacent said movable bar, and a movable clamping means mounted for movement between a first position in which said stationary bar is gripped between said first clamp member and said clamping means, and a second position in which said movable bar is gripped between said second clamp member and said clamping means.

4. The combination according to claim 3 including means responsive to the said individual tool control means for actuating said clamping means between said first and second positions thereof, including a power-operated means movably supporting said clamping means.

5. The combination according to claim 2 wherein said movable bar is connected to said transverse carriage for movement therewith.

6. In a multiple torch-shape cutting machine having a main carriage mounted for movement along a first axis, a transverse carriage mounted on said main carriage for movement transversely of said first axis, a plurality of cutting torches supported for movement with said main carriage and for movement with said transverse carriage, and a programmed tape control means for automatically controlling operation of said cutting machine, the combination comprising an elongated frame means supported on said carriage and extending along said transverse axis, a plurality of torch supporting members mounted on said frame means for movement along said transverse axis, each torch supporting member carrying one of said torches, said mounting means for said torch supporting members comprising a guide means for guiding the torch movement along said transverse axis, and means for positioning said torch supporting members at various locations along said elongated frame member including a stationary bar extending along said transverse axis, a movably mounted bar extending along said transverse axis, and means for automatically engaging said torch supporting members with either said stationary bar or said movable bar in response to a control signal from said programmed tape control.

7. The combination according to claim 6 wherein said torch support engaging means for each torch comprises a first clamp member secured to the associated torch supporting member and positioned adjacent said stationary bar, a second clamp member secured to the associated torch supporting member and positioned adjacent said movable bar, and a movable clamping means mounted for movement between a first position in which said stationary bar is clamped between said first clamp member and said clamping means, and a second position in which said movable bar is clamped between said second clamp member and said clamping means.

8. The combination according to claim 7 wherein the mounting means for said clamping means includes a power operated means movably supporting said clamping means.

9. The combination according to claim 6 including control means responsive to said programmed tape control for moving said movable bar.

10. The combination according to claim 9 wherein said movable bar is connected to said transverse carriage for movement therewith, and said last-named control means controls the movement of said transverse carriage and said movable bar.